May 11, 1954 P. E. VOLZ 2,678,387
TONE CONVERTER
Filed April 11, 1950
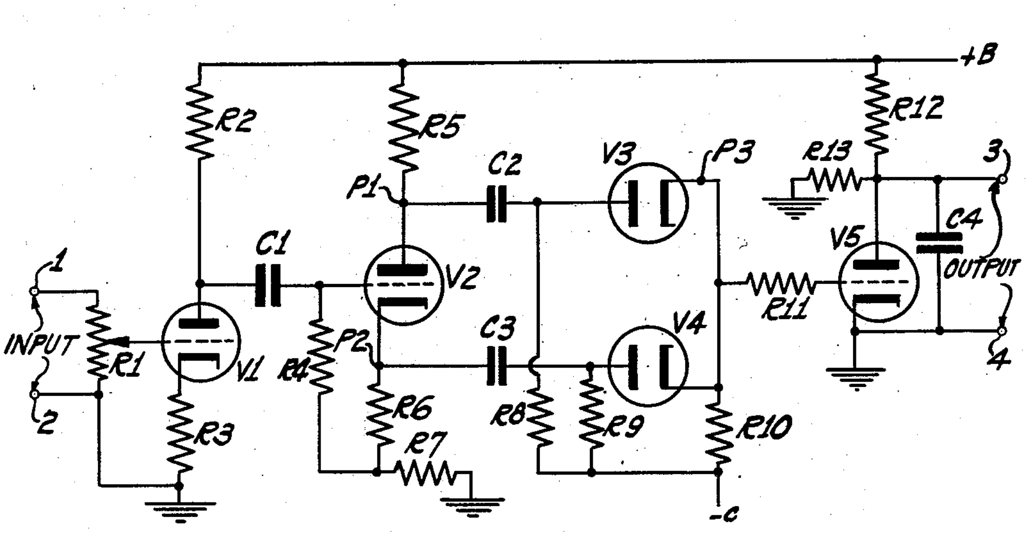
Fig_1
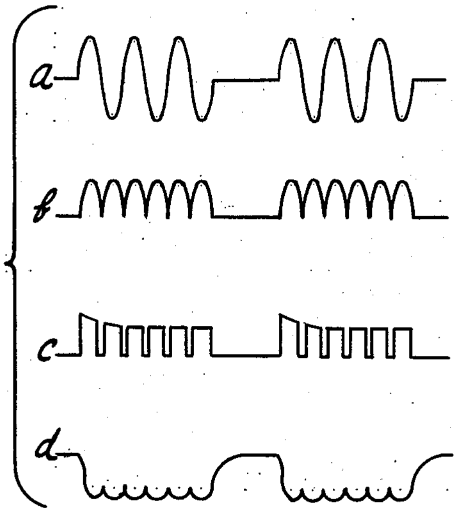
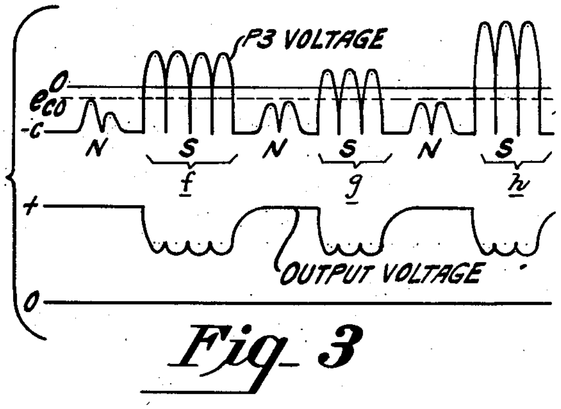
Fig_3
Fig_2
INVENTOR
Philip E. Volz
BY Harry Tunick
ATTORNEY Patented May 11, 1954

2,678,387

UNITED STATES PATENT OFFICE 2,678,387

TONE CONVERTER

Philip E. Volz, Florham Park, N. J., assignor to Radio Corporation of America, a corporation of Delaware Application April 11, 1950, Serial No. 155,233

3 Claims. (Cl. 250—27)

This invention relates to a tone converter. More particularly, it relates to a circuit for converting a keyed or interrupted tone telegraph signal into a keyed direct current telegraph signal. Such circuits are generally termed tone signal converters.

Radio printer and telegraph systems transmit intelligence in the form of a succession of so-called mark and space intervals. The mark intervals are characterized by the presence of current of tone frequency. The space intervals are identified by the absence of tone. Therefore, the incoming keyed tone signals for the circuit of this invention may be termed amplitude modulated audio carrier frequency. These tone signals must be rectified before they are applied to the receiving printer.

In general, the keyed D. C. signal output of a tone signal converter is not the envelope of the keyed tone signal. Rather, it is a squared-up wave obtained by thresholding and limiting. In this way, variations in the keyed tone signal, such as carrier amplitude variations during mark intervals and noise during space intervals, may be eliminated from the keyed D. C. signal output. This is true, of course, provided the variations and noise are not of too great an amplitude.

The usual form of tone signal converter consists of a signal amplifier, a full-wave rectifier, a low-pass filter, a thresholding and limiting device, and an output device. With keyed tone telegraph signals, the ratio of the carrier tone frequency to the keying rate may not be very high. In order to remove a large portion of the ripple from the rectified signal and still allow a reasonably fast rise and fall time at the filter output, a filter having a sharp cut-off is required. This necessitates the use of an inductor, capacitor filter. Filters of this type are elaborate, complicated and expensive.

An object of this invention is to devise a simple tone signal converter circuit, requiring only an RC filter as compared to previous arrangements requiring multisection LC filters.

Another object is to provide a tone signal converter circuit which will operate effectively at very low signal levels.

Still another object is to provide a tone signal converter circuit in which thresholding and limiting are carried out at a voltage level such that variations in tube characteristics do not cause poor performance.

The foregoing and other objects of this invention will be best understood from the following description of an example thereof, reference being had to the accompanying drawing, wherein:

Fig. 1 is a diagram of a tone signal converter circuit according to this invention; and Figs. 2 and 3 are sets of waveforms useful in explaining the operation of this invention.

The objects of this invention are accomplished, briefly, in the following manner: The keyed tone input signals are amplified and applied to a phase splitter which provides two outputs 180 degrees out of phase. These two outputs are applied differentially to a full-wave rectifier. The common output of this rectifier is applied to a thresholding and limiting device. The output of the tone signal converter is derived from this thresholding device through a simple RC filter.

Now referring to Fig. 1, a keyed tone telegraph signal, of tone frequency and of sine wave form, is applied to the input terminals 1 and 2. Terminal 2 is grounded as shown. The keyed tone input signal across terminals 1 and 2 may have the form illustrated at *a* in Fig. 2. Potentiometer R1 connected between terminals 1 and 2 has its movable tap connected to the grid of tube V1. This allows adjustment of the portion of the total input signal reaching tube V1. As will be explained later, this potentiometer provides a single control which permits setting of the limiting and thresholding levels relative to the signal level. Tube V1 operates as a class A amplifier, and for this purpose its cathode is connected to ground through a biasing resistor R3 and its anode is connected through a resistor R2 to a positive polarizing source.

The output of tube V1 is coupled to a phase splitter V2 by a connection extending from the anode of tube V1 through a coupling condenser C1 to the grid of V2. A grid leak R4, R7 is provided between the grid side of C1 and ground. The cathode of tube V2 (point P2) is connected to ground through resistors R6 and R7. The anode of tube V2 (point P1) is connected to the positive source through resistor R5. The arrangement is such that voltages of sine wave form but of opposed polarity (that is, 180° out of phase) are developed across resistances R5 and R6, R7, so that they may be supplied as inputs to a full-wave rectifier comprising diodes V3 and V4. Such out-of-phase voltages at P1 and P2 are obtained by properly dimensioning the resistances R5 and R6, R7 and R4 to derive for the grid of V2 the proper negative bias due to potential drop in R6. The tube V2 then may be considered a somewhat conventional phase inverter tube supplying the signals differentially or in out-of-phase relation to the anodes of tubes V3 and V4. These signal potentials are supplied by way of coupling condensers C2 and C3 of appropriate size to couple into the anode circuits currents of the tone frequency supplied to the input 1, 2.

The anode of tube V3 is connected through a resistor R8 to a negative bias voltage $-c$. The anode of tube V4 is connected through a resistor R9 to the same negative voltage. The cathodes of diodes V3 and V4 are connected together at point P3 and are connected through a resistor R10 to the negative voltage $-c$. The D. C. return of the full-wave rectifier including tubes V3 and V4 is to the bias voltage source $-c$. However, due to the connection of both the anodes and cathodes of diodes V3 and V4 to the same bias voltage $-c$, there is no net bias on such diodes. Therefore, it may be considered that there is no bias applied to the rectifier of this invention. The rectifier V3, V4 operates in the manner of an ordinary full-wave rectifier.

The rectified signal voltage appears across the single output impedance R10. Such full-wave rectified tone at point P3 may have the form illustrated at *b* in Fig. 2.

The rectified voltage across R10 is connected through a resistor R11 to the grid of the output tube V5. Resistors R12 and R13 are connected in series between the positive polarizing source and ground to constitute a voltage divider. The anode of tube V5 is connected to the junction point of resistors R12 and R13, while the cathode of V5 is connected to ground. V5 is thus operated at a low plate supply voltage. V5 is operated with a fixed negative grid bias $-c$.

The pulsed plate current flowing in V5 (produced by the pulses *b* of Fig. 2) may have the form illustrated at *c* in Fig. 2.

The threshold or cut-off voltage level for tube V5 (above which level the signal at P3 must rise before any plate current flows in V5 and below which level V5 is cut off) is a rather small voltage negative with respect to zero or ground (cathode of V5) due to the use of a high-mu triode for V5 and also due to the fact that V5 is operated at a low plate voltage.

Resistor R11 has a large value of resistance as compared to the resistance between the grid and cathode of V5 when the grid goes positive. When point P3 goes positive with respect to ground, the grid of V5 will go positive, drawing grid current through R11. Because of the low grid-cathode resistance under these conditions as compared to the resistance of R11, only a very small portion of the total voltage drop in the circuit will appear between the grid and cathode. Thus, the plate current magnitude is affected only slightly by the positive grid supply voltage at point P3, the grid current and large grid leaf R11 providing a limiting action under these conditions. Thus, the limiting level for tube V5 may be considered to be at zero voltage.

Filter capacitor C4 is connected from plate to cathode of tube V5. This capacitor removes a large portion of the ripple from the keyed D. C. signal which appears across the output terminals 3 and 4. R12 and R13 serve as the resistors of the simple RC filter in the output. The keyed D. C. signal across output terminals 3 and 4 may have the form illustrated at *d* in Fig. 2.

From a comparison of waveforms *a* and *d* in Fig. 2, it will be seen that by the circuit of this invention a keyed tone telegraph input signal *a* is converted into a keyed D. C. telegraph output signal *d*.

Fig. 3 illustrates how the single control at R1 may be used to set the thresholding and limiting levels. The wave shown in the upper part of this figure represents the voltage of point P3 with respect to zero or ground. The cut-off voltage of V5 is indicated by the dotted line $e_{co}$. As previously stated, this is a small voltage with respect to zero or ground due to the use of a high-mu triode for V5 and also because V5 is operated at a low plate voltage. If the voltage at point P3 is more negative than or below the cut-off voltage $e_{co}$, no plate current flows in V5. If the point P3 voltage is above zero, the plate current magnitude is affected only slightly by the positive grid signal voltage. This is due to the limiting action provided by the grid current through the large resistor R11, as previously described.

The base line for signal voltage at P3 is the fixed bias voltage $-c$. This is due to the connection of one end of the rectifier load resistor R10 to this negative bias voltage. The connection of this bias voltage source to tubes V3 and V4 brings the operating D. C. level of the full-wave rectifier to the fixed negative voltage $-c$. The thresholding ($e_{co}$) and limiting (zero) levels are fixed with respect to the P3 signal base line ($-c$).

Since the thresholding and limiting levels are fixed with respect to the P3 signal base line, the signal amplitude at P3 determines the threshholding and limiting levels relative to the signal amplitude. Therefore, the thresholding and limiting may be adjusted by varying the P3 signal amplitude by means of the single movable tap on R1.

Illustrated in Fig. 3 are three different amplitudes of P3 signal. The signal (mark) voltage is denoted by S, while the noise voltage (occurring during space) is denoted by N. At *f* the limiting level is at about one-half the peak signal amplitude and the noise may rise to almost half the signal amplitude, or the signal may fade to almost half the peak amplitude shown, without affecting the keyed D. C. output voltage. The wave shown at the lower part of Fig. 3 illustrates with respect to a zero base line the keyed D. C. output voltage of the circuit of Fig. 1 for the three corresponding amplitudes of P3 signal indicated in the upper part of Fig. 3.

At *g* in Fig. 3, the limiting (zero voltage) level is set higher on the signal than at *f*. In other words, the signal amplitude at P3 has now been reduced by operation of control R1. This setting permits more noise at P3 (lower signal-to-noise ratio), but less fading of the signal, before the output becomes distorted.

At *h* in Fig. 3, the limiting level is set lower on the signal than at *f*. In other words, the signal amplitude at P3 has now been increased by operation of control R1. This setting permits more fading of the signal at P3, but less noise (as compared to the signal), before the output becomes distorted.

In connection with the foregoing description, it may be seen that the output of the converter circuit of this invention will become distorted only when the signal peaks drop to or below the zero (limiting) level in Fig. 3, or when the noise peaks rise to or above the $e_{co}$ (thresholding) level in Fig. 3. For the three different signal amplitudes depicted in Fig. 3, and for the noise amplitudes shown, the keyed D. C. output is undistorted, being thresholded to eliminate noise occuring during space intervals and limited to eliminate carrier amplitude variations occurring during mark intervals. It will be seen that the keyed D. C. output signal levels for the three P3 signal levels shown at *f*, *g* and *h* are all of the same amplitude.

According to this invention, the thresholding and limiting are accomplished at a point P3 where the signal level is large. Therefore, the tone signal converter will operate effectively at very low input signal levels. Also, because of this, original variations in tube characteristics due to replacement, as well as variations in such characteristics due to aging, will not affect the operation of the converter. Further, since the thresholding and limiting are accomplished after the two signal phases have been combined at P3, differences between the characteristics of the two tubes V3 and V4 do not affect the operation of the converter.

What is claimed to be my invention is:

1. In a signal converter, means for deriving from an input wave two corresponding voltage waves of opposite relative phase, a full-wave rectifier differentially excited by said waves, an output impedance coupled to said rectifier, a single-ended electron discharge device having a control grid coupled to said impedance and also having a cathode, means for applying a bias potential to said control grid of a value sufficient to bias said device beyond cutoff, thereby to cause the same to act as a thresholding device at a fixed direct current thresholding voltage, a resistor in series in the grid-cathode circuit of said device, said resistor having sufficient resistance to produce a current-limiting bias on said grid in response to the drawing of current by such grid, and an output circuit coupled to said device.

2. In a telegraph system, means for converting a keyed or interrupted tone telegraph signal into a keyed direct current telegraph signal, comprising: means for deriving from an input keyed tone signal two corresponding voltage waves of opposite relative phase, a full-wave rectifier differentially excited by said waves, an output impedance coupled to said rectifier, a single-ended electron discharge device having a control grid coupled to said impedance and also having a cathode, means for applying a fixed direct current bias potential to said device sufficient to bias the same beyond cutoff, thereby to cause the same to act as a thresholding device, a resistor in series in the grid-cathode circuit of said device, said resistor having sufficient resistance to produce a current-limiting bias on said grid in response to the flow of current in the grid circuit, and an output circuit coupled to said device.

3. In a signal converter, a phase inverter electron discharge device having anode and cathode electrodes and individual resistors therefor across which voltage waves of opposite relative phase may be made to appear, means for supplying a signal wave to the input of said device, thereby to produce voltage waves of opposite relative phase across said resistors, a full-wave rectifier differentially coupled to said resistors to be differentially excited by said voltage waves of opposite relative phase, an output impedance coupled to said rectifier, a single-ended electron discharge device having a control grid coupled to said impedance and also having a cathode, means for applying a bias potential to said control grid of a value sufficient to bias said device beyond cutoff, thereby to cause the same to act as a thresholding device, a resistor in series in the grid-cathode circuit of said last-named device, said resistor having sufficient resistance to produce a current-limiting bias on said grid in response to the flow of current in the grid circuit, and an output circuit coupled to said last-named device.

References Cited in the file of this patent

UNITED STATES PATENTS

| Number | Name | Date |
|---|---|---|
| 2,115,881 | Roosenstein | May 3, 1938 |
| 2,215,776 | Barnard | Sept. 24, 1940 |
| 2,226,459 | Bingley | Dec. 24, 1940 |
| 2,432,188 | Bliss | Dec. 9, 1947 |
| 2,477,615 | Isbister | Aug. 2, 1949 |
| 2,539,774 | Gluyas | Jan. 30, 1951 |
| 2,597,038 | Scully | May 20, 1952 |
| 2,598,491 | Bergfors | May 27, 1952 |